UNITED STATES PATENT OFFICE.

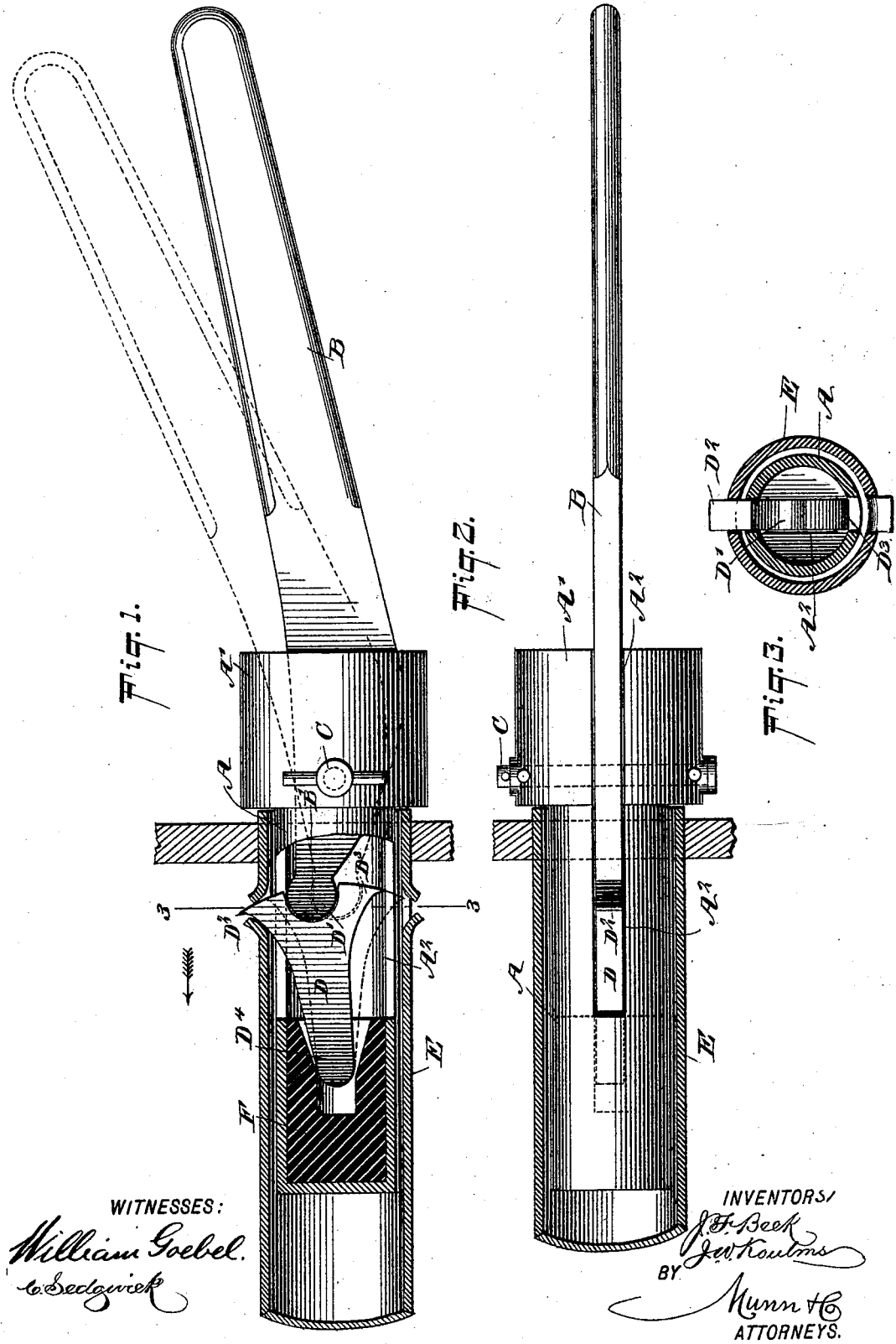

JOHN F. BECK AND JULIUS W. KOULMS, OF GRAND RAPIDS, MICHIGAN.

TUBE-CUTTER.

SPECIFICATION forming part of Letters Patent No. 516,424, dated March 13, 1894.

Application filed June 21, 1893. Serial No. 478,331. (No model.)

*To all whom it may concern:*

Be it known that we, JOHN F. BECK and JULIUS W. KOULMS, of Grand Rapids, in the county of Kent and State of Michigan, have invented a new and Improved Tube-Cutter, of which the following is a full, clear, and exact description.

The object of the invention is to provide a new and improved tube cutter, which is simple and durable in construction, very effective in operation, and arranged to enable the operator to rapidly cut the tube without much exertion.

The invention consists of a cutter guided and mounted to swing in a mandrel, and a lever fulcrumed on the mandrel and engaging the cutter at its free end to impart a swinging motion to the same to cut the tube.

The invention also consists of certain parts and details, and combinations of the same, as will be hereinafter described, and then pointed out in the claims.

Reference is to be had to the accompanying drawings, forming a part of this specification, in which similar letters of reference indicate corresponding parts in all the figures.

Figure 1 is a sectional side elevation of the improvement as applied. Fig. 2 is a plan view of the improvement as applied and with the tube and flue sheet in section; and Fig. 3 is a cross section of the improvement on the line 3—3 of Fig. 1.

The improved tube cutter is provided with a cylindrical mandrel A formed with a head A' and having a longitudinally-extending slot $A^2$, into which extends part of a lever B, fulcrumed on a pivot C secured in the head A' of the mandrel. The handle end of the lever B extends beyond the head A', so as to be within convenient reach of the operator for manipulating the said lever to cut the tube as hereinafter more fully described.

On the inner end of the lever B is formed a rounded offset B' engaging a correspondingly-shaped recess or notch D' in the free end of a cutter D, mounted to swing in the mandrel A and having on opposite sides of the notch D' the cutting edges $D^2$ and $D^3$ adapted to alternately engage the top and bottom of the flue E to be cut, at the time a swinging motion is given to the lever B. The pivot end $D^4$ of the cutter D is engaged in a heavy rubber socket F contained within the rear end of the mandrel A and forming the fulcrum for the said cutter D.

The device is used as follows: The mandrel A with the lever B and cutter D in position shown in dotted lines in Fig. 1, is passed into the flue or tube E to be cut and then the operator first presses on the handle of the lever B to cause the inner end of the said lever to swing upward and thereby impart a like swinging motion to the cutter D, so that the cutting edge $D^2$ cuts the top part of the flue E to a distance corresponding to the width of the cutting edge $D^2$. The operator then imparts an upward swinging motion to the handle end of the lever B, so that a downward swinging motion is given to the cutter D, whereby the cutting edge $D^2$ is moved out of contact with the cut made by it, while the other cutting edge $D^3$ engages the bottom of the tube or flue, to cut the same, as shown in Figs. 1 and 3. After the tube has thus been cut at opposite sides, the lever B is moved to its normal position shown in dotted lines in Fig. 1, so that the cutter D is confined within the slot $A^2$ of the mandrel and then the operator turns the mandrel to move the cutting edges $D^2$ and $D^3$ onto uncut parts of the tube or flue. The above described operation is then repeated, that is, an up and down swinging motion is given to the lever B to cut the tube at opposite places by the cutting edges $D^2$ and $D^3$. This operation is repeated; that is, after the cuts have been made the mandrel is turned until the entire circumference of the tube has been cut. It will be seen that by this arrangement a tube can be very quickly cut, as an up and down stroke of the lever B severs the tube at two places. It will also be seen that the tube cutter is composed of but few parts and is not liable to get out of order easily.

Having thus fully described our invention, we claim as new and desire to secure by Letters Patent—

1. A tube cutter, comprising a cutter pivoted in a mandrel, and a lever pivoted on the said mandrel and having one end engaging the free end of the cutter, and its other end extending beyond the mandrel, substantially as and for the purpose set forth.

2. A tube cutter comprising a mandrel, a cutter mounted to swing in the said mandrel and having double cutting edges, and a lever fulcrumed in the mandrel and engaging the free end of the said cutter between its cutting edges, substantially as shown and described.

3. A tube cutter comprising a slotted mandrel, a rubber socket held therein, a cutter seated in the said rubber socket and formed with two cutting edges and a recess between the cutting edges, and a lever fulcrumed in the said mandrel and having its inner end formed with an offset engaging the said recess in the cutter, substantially as shown and described.

JOHN F. BECK.
JULIUS W. KOULMS.

Witnesses:
CHARLES B. DRESSLER,
RUSSEL ELLIS.